(12) United States Patent
D'Eletto

(10) Patent No.: US 6,589,322 B2
(45) Date of Patent: Jul. 8, 2003

(54) OIL SEAL LIQUID SEPARATOR

(75) Inventor: Daniel C. D'Eletto, Middle Island, NY (US)

(73) Assignee: Keyspan Gas East Corp., Hicksville, NY (US)

( * ) Notice: Subject to any disclaimer, the term of this patent is extended or adjusted under 35 U.S.C. 154(b) by 0 days.

(21) Appl. No.: 09/968,956

(22) Filed: Oct. 3, 2001

(65) Prior Publication Data

US 2003/0061935 A1 Apr. 3, 2003

(51) Int. Cl.[7] .......................... B01D 19/00; B01D 45/12
(52) U.S. Cl. .................. 96/189; 55/320; 55/337; 55/456
(58) Field of Search .................. 55/315, 320, 337, 55/456; 96/188, 189, 190

(56) References Cited

U.S. PATENT DOCUMENTS

| | | | | |
|---|---|---|---|---|
| 735,192 A | * | 8/1903 | Allert | |
| 1,679,090 A | * | 7/1928 | Lammert | |
| 2,970,669 A | * | 2/1961 | Bergson | |
| 3,633,343 A | * | 1/1972 | Mark | 55/323 |
| 3,966,443 A | * | 6/1976 | Okano et al. | 422/177 |
| 4,482,364 A | * | 11/1984 | Martin et al. | 96/188 |
| 4,516,994 A | * | 5/1985 | Kocher | 210/304 |
| 4,702,893 A | * | 10/1987 | Kirk et al. | 422/111 |
| 4,946,483 A | * | 8/1990 | Coral | 55/323 |
| 5,113,671 A | | 5/1992 | Westermeyer | |
| 5,466,384 A | | 11/1995 | Prevost et al. | |

\* cited by examiner

*Primary Examiner*—Duane Smith
*Assistant Examiner*—Frank M. Lawrence
(74) *Attorney, Agent, or Firm*—Dickstein Shapiro Morin & Oshinsky, LLP

(57) ABSTRACT

A separator that uses both centrifugal force and gravity can effect the near-complete separation of liquid particles entrained in a gaseous stream having a high flow rate and velocity. The separator includes a conduit disposed in a vertical orientation, a baffle axially disposed in the conduit, a wire mesh disposed circumferentially around the baffle, and an absorbant filter disposed circumferentially around the wire mesh. The entrained liquid-containing gaseous stream enters the separator through a separator first end, and exits the separator from a separator second end as an essentially liquid-free gaseous stream. By virtue of using the baffle, mesh, and filter to effect the separation of the entrained liquid particles, the separator can effect near-complete liquid removal, yet without imposing any significant back pressure.

10 Claims, 3 Drawing Sheets

OIL SEAL LIQUID SEPARATOR

BACKGROUND OF THE INVENTION

1. Field of the Invention

The invention relates generally to an apparatus for separating a liquid component from a gaseous component. The invention relates more specifically to an apparatus for removing liquid particles entrained in a gaseous flow stream.

2. Description of the Related Art

Gas distribution systems, such as those used for the distribution of natural gas, employ pressure relief devices known as oil seals on the outlet side of regulator stations that feed low pressure gas systems. By design, when the pressure in the gas main exceeds the static pressure head of the oil in the oil seal, the oil is forced out of the lower chamber of the seal and into the upper chamber as the gas continues up a vent stack and exits out the top to the atmosphere. In practice, however, due to very high gas flow rates, the oil is atomized and carried out of the vent stack along with the gas. Since the oil used is typically kerosene, an emergency spill response is then needed to remove the oil from lawns, cars, and streets in the vicinity of the stack.

Since replacement of the oil seals with a different device is a costly alternative for even a portion of an entire gas distribution system, a solution is needed that prevents the kerosene from exiting the vent stack. Various conventional devices for effecting a liquid-from-fluid separation are known. For example, U.S. Pat. No. 735,192 describes a separator for removing oil or grease from fluids. The separator has a chamber (disclosed as being an upright cylinder), a baffle-plate in the form of an upright cylinder, and a drainage chamber, which is an annular chamber surrounding the baffle-plate. The separator uses spiral guides to guide the fluid along the inside of the cylindrical baffle-plate. The rotary motion imparted to the fluid by the spiral guides tends to throw out the minute particles of oil or grease and bring them into contact with the cylindrical baffle-plate.

U.S. Pat. No. 2,970,669 describes a condensing filter. The filter has a tubular body portion, a spiral member, and an absorbent wick. The wick absorbs fractions of gas which drain to it after condensing on the walls of the spiral passageway formed by the spiral member and the tubular body portion. The condensed fraction drains downwardly in the wick and is collected in the bottom of the separator.

U.S. Pat. No. 5,113,671 describes a device for separating oil from a gas. The separator has a housing forming a peripheral wall with an inlet at a top end of the housing for receiving an oil/gas mixture, a gas outlet formed by a conduit extending through the top end of the housing, and an oil outlet at a bottom end of the housing. Within the housing there is a static auger extending between a gas outlet conduit and the peripheral wall to cause the oil/gas mixture to flow in a largely circumferential path along the peripheral wall. Lining an inside surface of the housing is a means for collecting and separating oil, preferably in the form of a mesh screen. The collected oil drips from the screen to a baffle having apertures therein. The oil is received in an oil collection chamber below the baffle.

U.S. Pat No. 5,466,384 describes a device for carrying out phase separation by filtration and centrifugation. The device has a chamber with a filtration wall, such as a membrane, and a helical part. Discharge lines are provided for discharging respectively the permeate and retentate of the mixture to be separated.

Each of the above-described patents discloses a device that relies upon a spiral-type element to effect at least a portion of the separation. Various drawbacks are associated with the devices, however, including incomplete separation and the imposition of an unacceptably high back pressure for use in a gas distribution system.

Therefore, a need exists for an apparatus capable of removing a relatively small volume of liquid entrained in a gaseous stream having a high flow rate and velocity, yet without also imposing an unacceptably high back pressure to the gaseous stream.

BRIEF SUMMARY OF THE INVENTION

The present invention provides an apparatus for removing liquid particles entrained in a gaseous flow stream. More specifically, the present invention provides an apparatus capable of removing a relatively small volume of liquid entrained in a gaseous stream having a high flow rate and velocity.

Accordingly, the present invention relates to a separator comprising a conduit disposed in a vertical orientation, a baffle axially disposed in the conduit, a wire mesh disposed circumferentially around the baffle, and an absorbant filter disposed circumferentially around the wire mesh. The entrained liquid-containing gaseous stream enters the separator through a separator first end, and exits the separator from a separator second end as an essentially liquid-free gaseous stream.

The invention also relates to a method of separating an entrained liquid from a gaseous stream with the separator. The method comprises passing the entrained liquid-containing gaseous stream through the separator first end, imparting a rotational flow to the entrained liquid-containing gaseous stream with the baffle, collecting the rotating liquid with the wire mesh so as to separate the entrained liquid from the gaseous stream, absorbing the collected liquid with the absorbant filter so as to produce an essentially liquid-free gaseous stream, and passing the essentially liquid-free gaseous stream from separator second end.

By virtue of using both centrifugal force and gravity to effect the separation of the entrained liquid particles, the separator can effect near-complete liquid removal in a gaseous stream flow rate of up to 70,000 cfh, yet without the imposition of any significant back pressure. Using the baffle, mesh, and filter to effect the separation, the separator is mechanically simple, and therefore relatively inexpensive to install and maintain.

BRIEF DESCRIPTION OF THE DRAWINGS

Other features and advantages of the present invention will become more fully apparent from the following detailed description of the exemplary embodiments of the invention which are provided in connection with the accompanying drawings.

DETAILED DESCRIPTION OF THE INVENTION

The present invention will be understood from the exemplary embodiments described herein.

The present invention relates to an apparatus for removing liquid particles entrained in a gaseous flow stream. The method is particularly useful for the removal of a relatively small volume of liquid that is entrained in a gaseous stream having a high flow rate and velocity.

Figure 1:
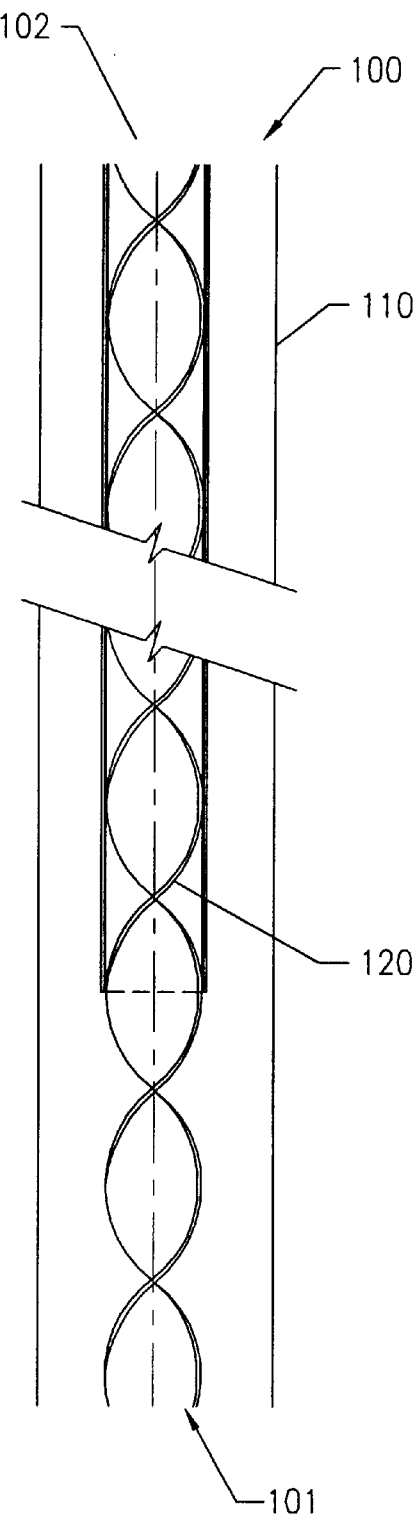
FIG. 1 is a cross-sectional elevation view of a separator constructed in accordance with the present invention.
Figure 2:
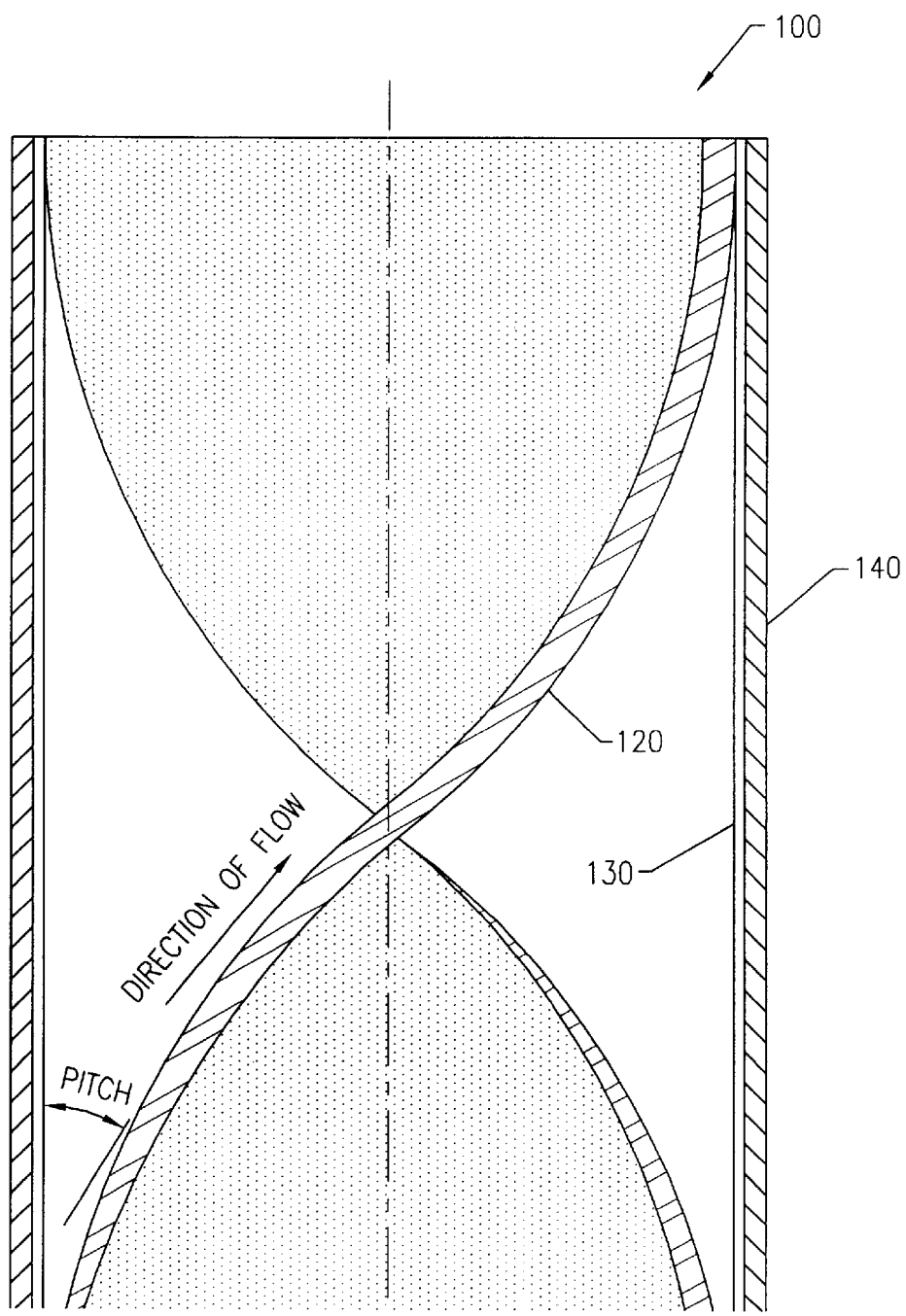
FIG. 2 illustrates details of the separator depicted in FIG. 1.

FIG. 1 is a cross-sectional elevation view of a separator 100 constructed in accordance with the present invention. FIG. 2 illustrates details of the separator 100 depicted in FIG. 1. The separator 100 comprises a conduit 110 disposed in a vertical orientation, a baffle 120 axially disposed in the conduit 100, a wire mesh 130 disposed circumferentially around the baffle 120, and an absorbant filter 140 disposed circumferentially around the wire mesh 130. The entrained liquid-containing gaseous stream enters the separator 100 through separator first end 101, and exits the separator 100 from separator second end 102 as an essentially liquid-free gaseous stream.

The baffle 120, which in a typical embodiment has a helical shape, is capable of imparting a rotational flow to the liquid-containing gaseous stream. By imparting a rotational flow, the heavier liquid particles are sheared from the flow stream by centrifugal force. The sheared liquid particles are then absorbed by the absorbant filter 140 as the dry gaseous flow exits the separator 100. The separator 100, therefore, uses both centrifugal force and gravity to effect the separation of the heavy liquid particles entrained in the gaseous flow stream.

Since the baffle 120 is a flow-through baffle, no significant back pressure is developed from the added resistance to flow. In a typical embodiment, the baffle 120 has a pitch of from about 30° to about 50°. In a more typical embodiment, the baffle 120 has a pitch of about 45°, which provides optimal liquid removal without a significant increase in back pressure. For example, while a pitch of greater than 45° will increase the degree of liquid separation, the added resistance to flow increases the back pressure by about 0.5 psi for a flow rate of 70,000 cubic feet per hour ("cfh"). In a typical embodiment, the baffle 120 has a diameter of about 4 inches, has a thickness of from about 1/8 inch to about 3/16 inch, and is of stainless steel construction.

The wire mesh 130 serves to collect the rotating liquid and route it from the gaseous stream to the absorbant filter 140. In a typical embodiment, the wire mesh 130 is approximately 1/16 inch wire mesh or flat expanded steel, and is of stainless steel construction.

The absorbant filter 140 serves to absorb the collected liquid routed to it by the wire mesh 130. In a typical embodiment, the absorbant filter 140 is approximately 1/8 inch thick, and comprises a material capable of effecting the desired degree of absorption such as, for example, polypropylene. For example, a 1/8 inch thick polypropylene filter can absorb approximately five times its own weight, i.e., about 3 lbs. or 0.45 gallons of oil.

Figure 3:
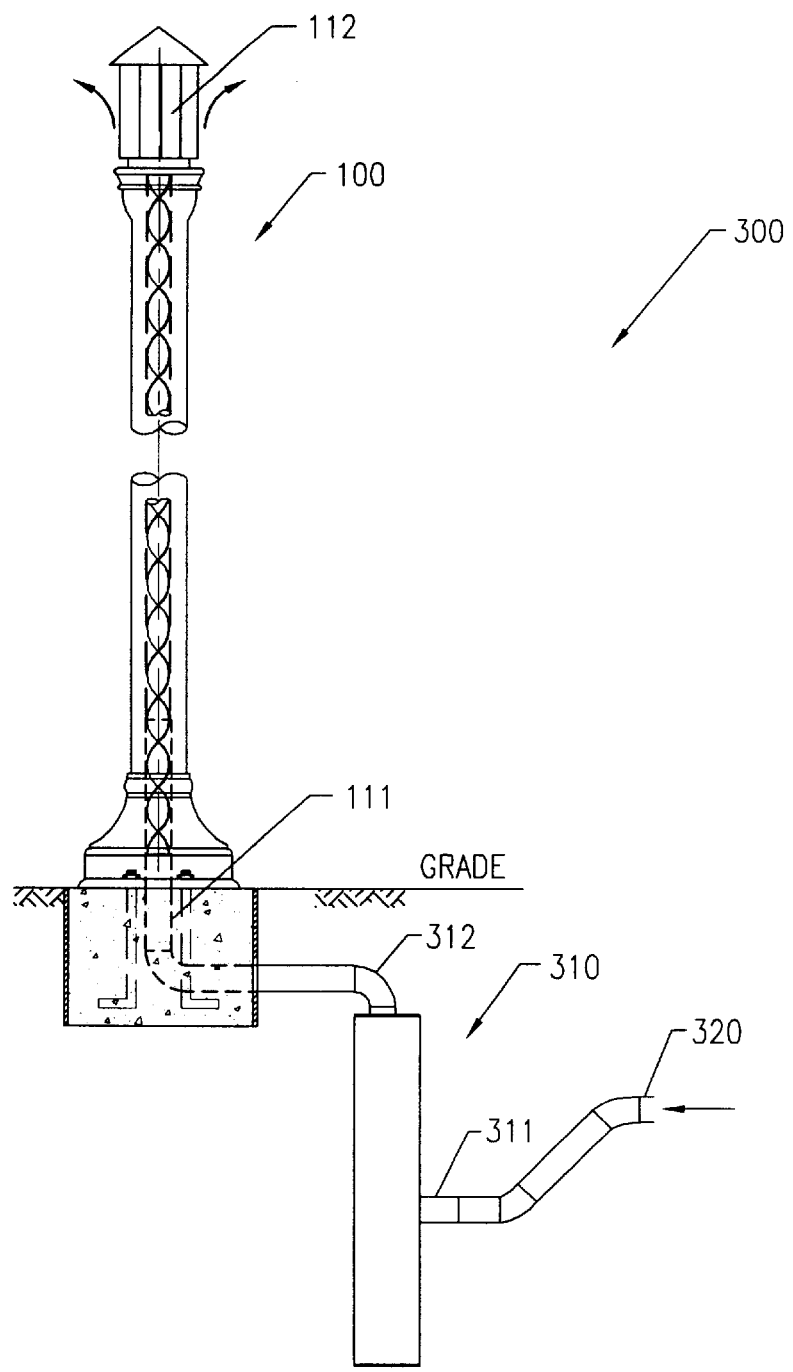
FIG. 3 is a cross-sectional elevation view of a liquid seal pressure relief system that includes the separator depicted in FIG. 1.

In another embodiment, the invention relates to a liquid seal pressure relief system 300. FIG. 3 is a cross-sectional elevation view of the liquid seal pressure relief system 300 that includes the separator 100 depicted in FIG. 1, and a liquid seal 310.

The liquid seal 310 comprises a sealing liquid, a seal inlet 311, and a seal outlet 312, with the seal inlet 311 being in fluid communication with a conduit 320 for conveying a gaseous flow. The separator 100, which is in fluid communication with the seal outlet 312, is capable of separating the sealing liquid that is entrained in the gaseous flow during a pressure relief situation. The separator 100 comprises a conduit 110 disposed in a vertical orientation. The conduit 110 includes a conduit inlet 111 in fluid communication with the seal outlet 312, and a conduit outlet 112 in fluid communication with the atmosphere for discharging the essentially liquid-free gaseous stream.

The entrained sealing liquid is typically a liquid hydrocarbon, such as, for example, kerosene, or a similar liquid capable of effecting the requisite seal. The gaseous stream typically comprises natural gas.

The invention also relates to a method of separating an entrained liquid from a gaseous stream with separator 100. The method comprises passing the entrained liquid-containing gaseous stream through the separator first end 101, imparting a rotational flow to the entrained liquid-containing gaseous stream with the baffle 120, collecting the rotating liquid with the wire mesh 130 so as to separate the entrained liquid from the gaseous stream, absorbing the collected liquid with the absorbant filter 140 so as to produce an essentially liquid-free gaseous stream, and passing the essentially liquid-free gaseous stream from separator second end 102.

In a typical embodiment, the liquid loading of the gaseous stream is approximately 0.5 gpm, or 3.125 lbs. of oil, at a gas flow rate of 35,000 cfh (110 ft/sec velocity). As indicated above, the entrained sealing liquid is typically a liquid hydrocarbon, such as, for example, kerosene. The gaseous stream typically comprises natural gas.

By virtue of using both centrifugal force and gravity to effect the separation of the entrained liquid particles, the separator 100 can effect near complete liquid removal. For example, tests have shown that the separator can effect essentially complete liquid removal in a gaseous stream of up to 70,000 cfh of natural gas or air. Advantageously, no significant back pressure effect on the gas distribution system is associated with the high degree of liquid separation.

The present invention, therefore, provides an apparatus for removing liquid particles entrained in a gaseous flow stream, and a method of separating liquid therewith. By virtue of using the baffle, mesh, and filter, the separator is capable of removing a relatively small volume of liquid entrained in a gaseous stream having a high flow rate and velocity, yet without the imposition of any significant back pressure. The separator is mechanically simple, and therefore relatively inexpensive to install and maintain.

Although the invention has been described and illustrated as being suitable for use in a natural gas distribution system, the invention is not limited to this embodiment. Rather, the invention could be employed in any service requiring the removal of liquid particles entrained in a gaseous flow stream where minimizing the resistance to flow associated with the separation is essential.

Accordingly, the above description and accompanying drawings are only illustrative of exemplary embodiments that can achieve the features and advantages of the present invention. It is not intended that the invention be limited to the embodiments shown and described in detail herein. The invention is limited only by the scope of the following claims.

What is claimed as new and desired to be protected by Letters Patent of the United States is:

1. A separator for separating a liquid entrained in a gaseous stream, said separator comprising:
   a conduit disposed in a vertical orientation;
   a baffle axially disposed in said conduit, said baffle capable of imparting a rotational flow to the liquid-containing gaseous stream;
   a wire mesh disposed circumferentially around said baffle, said wire mesh capable of collecting the rotating liquid; and an absorbant filter disposed circumferentially around said wire mesh, said absorbant filter comprising polypropylene and being capable of absorbing the collected liquid.

2. A separator according to claim 1, wherein said baffle has a helical shape.

3. A separator according to claim 2, wherein said baffle has a pitch of from about 30° to about 50°.

4. A separator according to claim 3, wherein said pitch is about 45°.

5. A separator according to claim 1, wherein said baffle has a diameter of about 4 inches.

6. A separator according to claim 1, wherein said mesh comprises stainless steel.

7. A liquid seal pressure relief system, said system comprising:

i) a liquid seal comprising a sealing liquid, a seal inlet, and a seal outlet, said seal inlet being in fluid communication with a conduit for conveying a gaseous flow, and ii) a separator in fluid communication with said seal outlet, said separator capable of separating said sealing liquid that is entrained in the gaseous flow during a pressure relief situation, said separator comprising:

a conduit disposed in a vertical orientation, said conduit comprising a conduit inlet in fluid communication with the seal outlet, and a conduit outlet in fluid communication with the atmosphere;

a baffle disposed axially in said conduit, said baffle capable of imparting a rotational flow to the liquid-containing gaseous stream;

a wire mesh disposed circumferentially around said baffle, said wire mesh capable of collecting the rotating liquid; and an absorbant filter disposed circumferentially around said wire mesh, said absorbant filter capable of absorbing the collected liquid.

8. A system according to claim 7, wherein said entrained sealing liquid is a liquid hydrocarbon.

9. A system according to claim 8, wherein said liquid hydrocarbon is kerosene.

10. A system according to claim 7, wherein said gaseous stream comprises natural gas.

* * * * *